United States Patent [19]

Stubbs

[11] Patent Number: 4,620,506

[45] Date of Patent: Nov. 4, 1986

[54] ROTATABLE ANIMAL TETHERING DEVICE

[76] Inventor: Harold L. Stubbs, 115 Riverview Dr., Hebron, Ky. 41048

[21] Appl. No.: 700,523

[22] Filed: Feb. 11, 1985

[51] Int. Cl.$^4$ ............................................. A01K 3/00
[52] U.S. Cl. ..................................... 119/117; 119/121
[58] Field of Search ............... 119/117, 118, 119, 121, 119/122, 123; 52/156, 157, 158, 165; 248/156, 530

[56] References Cited

U.S. PATENT DOCUMENTS

| | | | |
|---|---|---|---|
| 2,525,890 | 10/1950 | Gage | 119/121 |
| 2,551,540 | 5/1951 | Johnson | 119/121 |
| 2,607,320 | 8/1952 | Ashbaugh | 119/117 |
| 2,790,419 | 4/1957 | Sullivan | 119/121 |
| 3,921,589 | 11/1975 | McGahee | 119/121 |
| 4,491,091 | 1/1985 | Satterfield | 119/117 |

Primary Examiner—Robert P. Swiatek
Attorney, Agent, or Firm—Frost & Jacobs

[57] ABSTRACT

A rotatable animal tethering device made up of a flat bed having a plurality of legs which are driven into the ground. The bed has a circular opening to receive a collar which is fixed on a center stake which is also driven into the ground. The lower side of the bed is closed by a plate which, however, has a central orifice therein through which the stake is driven until such time as the collar is received within the circular opening of the bed and in engagement with the lower plate. The upper end of the stake is threaded so as to receive the collar. A tube is designed to be threaded onto the upper end of the stake and a cylinder has a telescoping fit over the tube so as to be rotatable thereabout. The cylinder has a lug to which the tether of the animal may be secured. The cylinder is freely rotatable about the tube and lateral forces generated by the pull of the animal will be in part absorbed by virtue of the collar and its fit within the bed.

1 Claim, 2 Drawing Figures

ROTATABLE ANIMAL TETHERING DEVICE

TECHINICAL FIELD

The instant invention relates to a tethering device for securing animals so that they may be left unattended while at the same time having some freedom of movement. The device is of the type which is anchored in the ground and includes a center stake having a stabilizing collar thereon and a rotatable member to which the tether is secured.

BACKGROUND ART

A search of the United States patent art was conducted in an effort to develop those United States patents which come closest to disclosing the invention; no assertion is made that the best art was thus developed although that was the intent of the search. The patents developed are:
 U.S. Pat. No. 2,525,890—Gage,
 U.S. Pat. No. 2,812,743—Dustin,
 U.S. Pat. No. 2,981,230—Putnam,
 U.S. Pat. No. 3,070,068—Chapman,
 U.S. Pat. No. 3,508,525—Sawyer,
 U.S. Pat. No. 4,197,818—Cowan.

The foregoing patents disclose various tethering devices including anchoring stakes having rotatable members associated therewith and to which the tether is secured. These devices, however, do not possess the stability of that of the instant invention.

DISCLOSURE OF THE INVENTION

The rotatable animal tethering device of the instant invention includes a bed member having legs that are to be driven into the ground. The bed member includes a circular opening closed on the underside by a second plate which has a center orifice through which the stake is passed, the stake also being driven into the ground. The stake has a collar thereon which is just nicely received within the circular opening of the bed member. This collar provides added stability to the arrangement. The collar is threaded onto the upper end of the stake and secured in place by a washer which is abutted by a whiz nut secured in the lower end of a tube, the tube also having a similar whiz nut secured in the upper end thereof. The tube, via the whiz nuts, is screwed onto the upper end of the stake into firm engagement with the washer which abutts the collar. A cylinder has a telescoping fit over the tube and has a lug extending therefrom to which the tether is secured. The cylinder is freely rotatable about the tube. A washer fits over the upper whiz nut and the whole assembly is held in place by an acorn nut which is threaded to the upper end of the threaded center stake.

By virtue of the foregoing arrangement, the animal is free to move completely around the stake without getting the tether tangled. Lateral forces stemming from the animal's pull against the tether and stake are in part dissapated by the collar which is received within the bed.

BREIF DESCRIPTION OF THE DRAWINGS

DETAILED DESCRIPTION OF THE INVENTION

Figure 1:
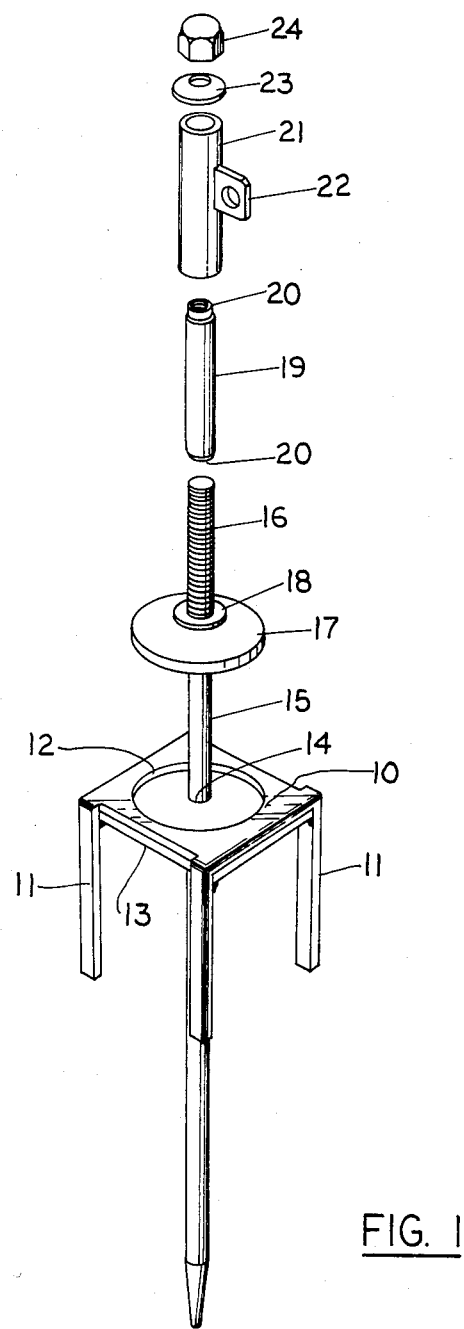
FIG. 1 is an exploded perspective view of the rotatable animal tethering device comprising the instant invention.
Figure 2:
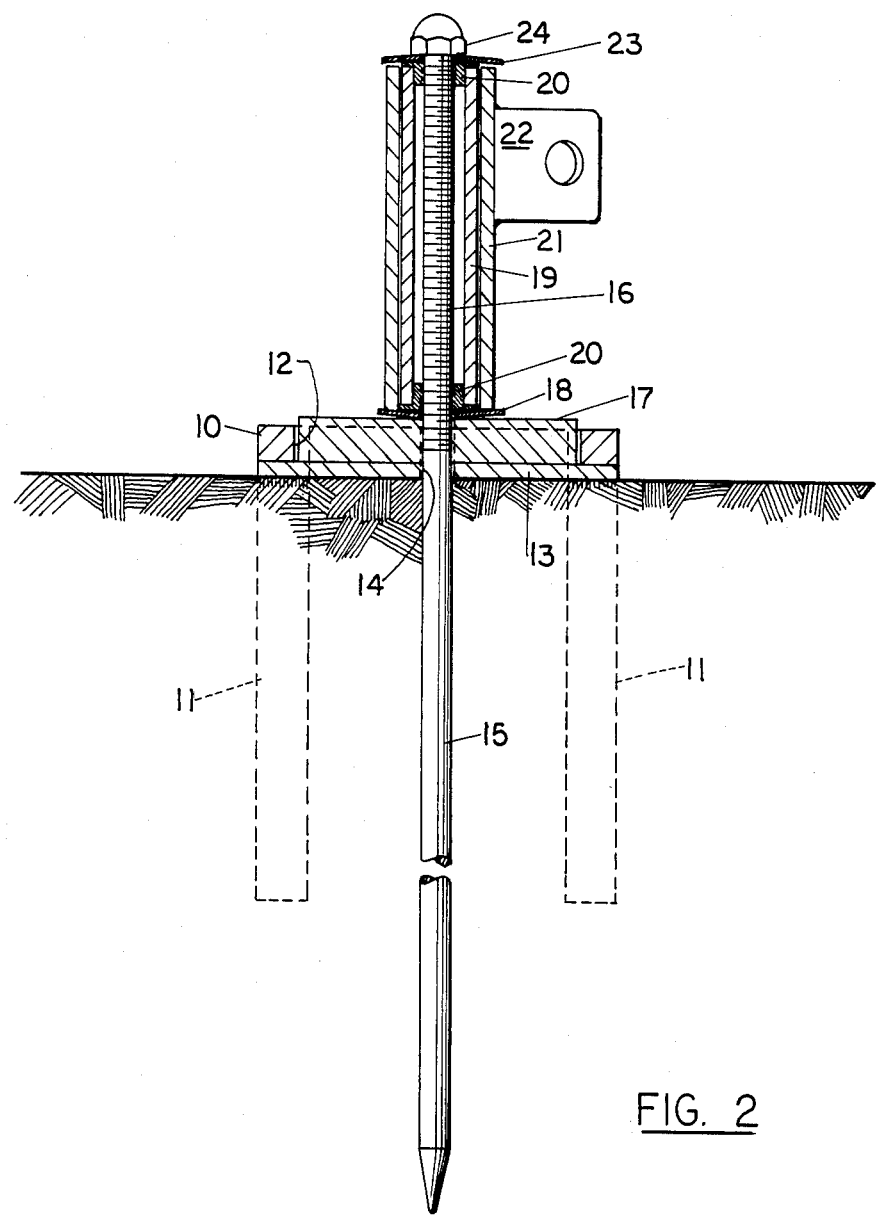
FIG. 2 is a sectional view illustrating the device when secured in the ground.

The rotatable animal tethering device of this invention comprises a bed 10 having legs 11 integral therewith. The bed 10 has a circular opening 12 therein. A plate 13 is secured beneath the bed 10 and serves as a bottom member for the circular opening. The plate 13 has a central orifice 14 therein which just nicely receives the stake 15.

The upper end of the stake 15 is threaded as indicated at 16. A collar 17 is threaded onto the stake end 16 until it reaches the end of the threaded portion. Preferably a washer 18 is moved into abutment with the collar 17. A tube 19 is provided with a whiz nut 20 at each end thereof. The whiz nuts 20 are internally threaded and have a tight press fit in the ends of the tube 19. The whiz nuts also have a flange which engages the outer end of the tube and it is common for nuts of this type to have the underside of the flange serrated. The tube 19 and whiz nuts 20 are threaded onto the portion 16 of the stake 15 until the lowermost whiz nut comes into tight engagement with the washer 18.

A cylinder 21 having a lug 22 extending laterally therefrom is designed to have a telescoping fit over the tube 19. That fit, although reasonably close, is such as to permit the cylinder to rotate freely about the tube 19. An upper washer 23 is placed about the threaded portion 16 of the stake 15 and engages the flange of the upper whiz nut 20. An acorn nut 24 is then threaded onto the extreme upper end of the threaded portion 16 of the stake 15 and is in tight engagement with the washer 23. In addition to being rotatable about the tube 19, the cylinder 21 is capable of a slight axial movement on the tube 19 and this is indicated by the small clearance between the top end of the cylinder 21 and the upper washer 23 when the lower end of such cylinder is at rest on the lower washer 18. This ensures that the cylinder will not bind on tube 19.

It will be understood that an animal will be provided with a suitable tether which is secured to the lug 22. The animal may walk a complete circle about the center stake 15 as permitted by the rotatable cylinder 21 to which the tether is fastened via the lug 22. When the legs 11 of the bed 10 are driven into the ground until such time as the lower plate 13 abuts the ground, the assembled stake device is inserted through the small orifice 14 and driven into the ground until such time as the collar 17 is received in the circular opening 12 formed in the bed 10 and further defined by the lower plate 13, the collar 17 abutting such lower plate. Lateral forces generated by the animal's pull against the tethering device are in part taken up by the collar 17 located in the bed 10 via the circular opening 12 closed on the underside by the plate 13. This relieves the stake 15 of some of the strain placed thereon by the pull of the animal and further ensures that the cylinder 21 will remain rotatable on the device.

It will be apparent to those skilled in the art that modifications may be made in this invention without departing from the scope thereof. And while the invention has been shown and described in terms of particular parts and arrangement, the invention is not to be limited to such parts and arrangement except insofar as they are specifically set forth in the subjoined claims.

What is claimed is:

1. A rotatable animal tethering device comprised of a first part including a flat bed member, legs on said flat bed member adapted to penetrate the ground, an annular opening in said flat bed member, and a plate secured to the underside of said flat bed member and extending under all of said annular opening, said plate having an orifice therein centrally of said annular opening; and a second part including a round stake threaded at one end, a collar threaded onto said stake, a tube secured to said stake above said collar, and a cylinder telescopically fit over said tube and rotatable thereabout, said tube being secured to said stake by means of a pair of internally threaded whiz nuts, one said nut being secured in each end of said tube, each said nut having a flange abutting its respective end of said tube, and both said nuts being in threaded engagement with the threaded end of said stake, a lug extending from said cylinder and to which an animal's tether may be secured, and means to hold said cylinder on said stake while permitting rotation of said cylinder; a bottom washer on said stake and engaging said collar and the flange of the lower whiz nut, and a top washer on said stake and engaging the flange of the upper whiz nut, the distance between said washers being greater than the length of said cylinder, and said means to hold said cylinder on said stake about said tube nad between said washers comprising a nut threaded on the uppermost end of said stake and engaging said top washer; said first part and said second part being assembled so that the lower end of said stake passes just nicely through said orifice into the ground, said legs also penetrating the ground and said plate engaging the ground, and said collar being just nicely received in said annular opening and abutting said plate.

* * * * *